United States Patent [19]

Huntoon

[11] 4,372,519
[45] Feb. 8, 1983

[54] APPARATUS FOR MOUNTING A MIRROR

[75] Inventor: Francis E. Huntoon, Des Plaines, Ill.

[73] Assignee: Teletype Corporation, Skokie, Ill.

[21] Appl. No.: 201,896

[22] Filed: Oct. 29, 1980

[51] Int. Cl.³ .............................................. A47G 29/00
[52] U.S. Cl. .................................... 248/466; 40/10 R
[58] Field of Search .............. 248/466, 467, 473, 489; 350/310; 40/10 R, 152

[56] References Cited

U.S. PATENT DOCUMENTS

| 2,204,862 | 6/1940 | Lehman | 248/466 |
| 2,220,310 | 11/1940 | Wood | 40/10 R |
| 4,120,586 | 10/1978 | Lessner | 248/466 X |

Primary Examiner—William H. Schultz
Assistant Examiner—Ramon O. Ramirez
Attorney, Agent, or Firm—W. K. Serp; J. C. Albrecht

[57] ABSTRACT

An apparatus for mounting a mirror 20 is described which includes a flat mounting plate 10 having a rectangular mirror opening 12. Positioned about the mirror opening 12 are spaced rectangularly shaped holes 18. Placed against the bottom wall 26 of a "U" shaped channel 22 is a sheet of foam material 34 upon which the back of a front surface mirror 20 is placed. The edges of the walls 28, 30 of the "U" shaped channel have tabs 32 which are placed into the holes 18. The tabs 32 are bent over or deformed to secure the channel 22 and mirror 20 to the mounting plate 10.

5 Claims, 3 Drawing Figures

APPARATUS FOR MOUNTING A MIRROR

TECHNICAL FIELD

This invention relates to an apparatus for mounting a mirror which apparatus is particularly suited for use in a facsimile scanner.

BACKGROUND ART

The electrical transmission of a document between two remote locations initially requires that the information on the document be converted to an electrical signal capable of amplification and transmission to the receiving location whereat the information is used to produce a copy of the original document. At the transmitting location, the document is optically scanned by a light beam the path of which passes through a lens and mirror system. To obtain acceptable resolution of the copy, the characteristics of the light path in the document scanning apparatus must be well defined and predictable. Various structures have been suggested for mounting the scanner components. Such mounting arrangements have been expensive, considerably complicated and unreliable. The mounting and positioning of the mirrors in such a scanner assembly is particularly critical since the reflective surface of the mirror must be precisely positioned with respect to the document and other components of the optical system to obtain the desired resolution in the copy. The mounting of the mirror is particularly difficult since the mirror adjustment and alignment mechanism introduce distortions in the mirror which stresses are relieved or increased when the temperature of the scanner rises during operation. Occasionally the mirrors are mounted using adhesive as the main securing device. This arrangement is particularly unsatisfactory since the characteristics of the adhesive change as it ages resulting in movement of the mirror. Described herein is a mirror mounting apparatus which assures that the mirror will remain accurately positioned over long periods of time and greatly minimizes mirror distortion.

THE DRAWING

DISCLOSURE OF THE INVENTION

In accordance with this invention, a mounting plate defines an opening. The mounting plate has substantially flat first and second parallel surfaces and a uniform thickness over that portion of the mounting plate adjacent the opening. A concave channel defines a cavity and a resilient compressible backing material is positioned within the cavity. Means are provided for securing the channel to the mounting plate so that the reflective surface of the mirror is adjacent and exposed through the opening defined by the mounting plate.

Preferably, the mounting plate defines at least two holes spacially located around the opening and the channel defines at least two mounting tabs for placement into the holes. The tabs are deformed after positioning into the holes thus securing the channel to the mounting plate.

DETAILED DESCRIPTION

Figure 1:
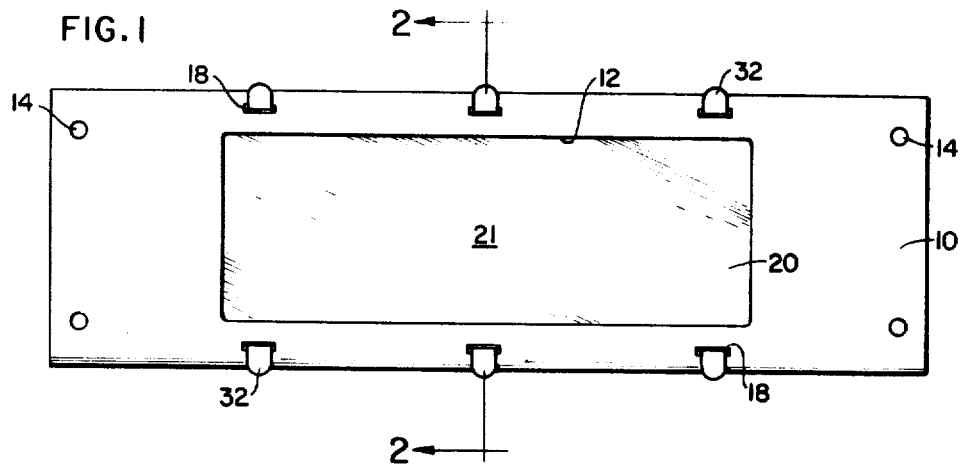
FIG. 1 is a top plan view of a mirror mounting apparatus.
Figure 2:
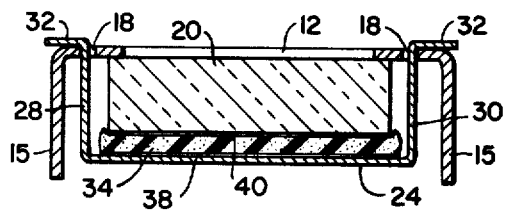
FIG. 2 is an enlarged full sectional view along the line 2—2 of FIG. 1.
Figure 3:
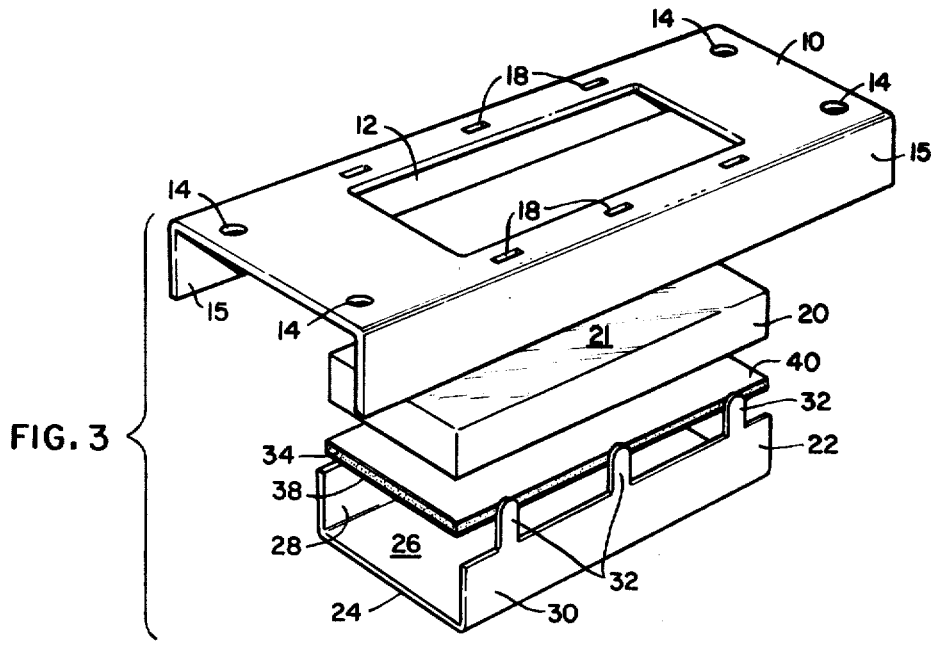
FIG. 3 is an exploded perspective view of the mirror mounting apparatus of FIG. 1.

As shown in FIG. 1 the mirror mounting apparatus includes a mounting plate 10 defining a rectangularly shaped mirror opening 12. The mounting plate 10 is constructed of steel or other similar material the thickness of which may be readily controlled. As will subsequently be more fully appreciated, the thickness of the mounting plate 10 in the illustrated embodiment is uniform to obtain the desired mirror positioning accuracy. The mounting plate 10 has four circular holes 14 for receiving fasteners (not shown) which secure the mounting plate 10 to the frame of a document scanner (not shown). To insure that the plate will exhibit the desired rigidity, the longitudinal edges of the plate are bent over to form lips 15.

Additionally, positioned adjacent the longitudinal edges of the mirror opening 12 and equally spaced therealong are a plurality of rectangular holes 18. Serving to hold and position a mirror 20 having an upper surface 21 against the plate 10 is a "U" shaped channel 22 defining a cavity 24 having a flat bottom wall 26 and a pair of relatively flat side walls 28, 30. The size of the mirror 20 is greater than the size of the mirror opening 12. The side walls 28, 30 are spaced apart a distance equal to the distance between the rows of holes 18 along the longitudinal edges of the mirror opening 12 defined by the mounting plate 10. Each of the upwardly disposed edges of the side walls 28, 30 of the channel 22 have a series of spaced elongated tabs 32. The tabs 32 are spaced for alignment with the holes 18 and have a width slightly less than the length of the holes 18. Further, the tabs 32 project above the side walls 28, 30 a distance somewhat greater than the thickness of the mounting plate 10.

A rectangular sheet of foam material 34 is positioned along the inside bottom wall 26 of the channel 22 and serves to urge the mirror 20 towards the mounting plate 10. Preferably the foam material 34 is cut to a shape slightly greater than the size of the mirror 20 to provide adequate support to the mirror 20 over its entire surface area. Any suitable foam or resilient sponge-like material such as polyurethane may be used so long as the material does not produce excessive strain in the mirror 20. The mirror 20 is positioned upon the foam material 34 and when the apparatus is assembled, the upper surface 21 of the mirror 20 is firmly held against the lower surface of the mounting plate 10. As shown, the upper surface 21 of the mirror 20 is coated with a reflective coating and thus the position of the reflective surface 21 of the mirror 20 is completely determined by the mounting plate 10. It will be appreciated that the thickness of the mirror 20 or any irregularities in a mirror thickness do not effect the location of the reflective surface 21. This is a particularly advantageous feature of the illustrative apparatus since it is relatively difficult under present manufacturing conditions to maintain the thickness of the mirror 20 without utilizing expensive grinding and polishing operations. During fabrication of the mirror 20 it is only necessary to maintain the reflective surface 21 flat as the thickness of the mirror may vary without adversely effecting the position of the reflective surface.

During assembly, the sheet of foam material 34 is positioned upon the surface of the bottom wall 26 of the channel 22. Preferably a small amount of adhesive 38 may be applied to the inside surface of the bottom wall 26 of the channel 22 to prevent relative movement of the foam material 34 with respect to the channel 22.

Another film of adhesive 40 is applied to the upper surface of the foam material 34 and the nonreflective side of the mirror 20 is placed upon the foam material 34. As previously mentioned the size of the mirror 20 is greater than the size of the mirror opening 12 defined by the mounting plate 10 and as the tabs 32 are positioned into the holes 18, the reflective surface 21 of the mirror 20 is brought into contact with the lower surface of the mounting plate 10. The channel 22 is forced towards the mounting plate 10 thus placing the foam material 34 under slight compression thereby urging the mirror 20 against the lower surface of the mounting plate 10. Once the channel 22 is in position, the tabs 32 are deformed or bent over thus securing the channel 22 to the mounting plate as shown. To permit deformation of the tabs 32 without their breaking from the channel 22, the channel is preferably constructed of a malleable material such as soft steel or copper. Alternately, the channel 22 and tabs 32 may be constructed of a plastic material and the tabs deformed by the application of heat thus securing the channel 22 to the mounting plate 10. After assembly, the apparatus is mounted to the scanner frame (not shown) at the desired location.

What is claimed is:

1. An apparatus for mounting a mirror (20) comprising:
    a mounting plate (10) with a mirror opening (12) defined in said mounting plate (10), said mounting plate (10) having a substantially flat first surface over that portion of the mounting plate (10) adjacent the opening (12);
    a concave channel (22) defining a cavity (24);
    a resilient compressible backing material (34) positioned in said cavity (24);
    a front surface mirror (20) positioned in said cavity (24) adjacent said resilient compressible backing material (34) with the reflective surface (21) of said mirror (20) disposed toward said opening (12) and adjacent said first surface;
    means (18, 32) for securing said channel (22) to said mounting plate (10) with said reflective surface (21) of said mirror (20) being positioned adjacent and exposed through the mirror opening (12) defined by said mounting plate (10);
    said mounting plate (10) defines at least two holes (18) spacially located around said opening (12);
    said channel (22) defines at least two mounting tabs (32) for placement into said holes (18) defined by said mounting plate (10) so that when said tabs (32) are deformed after positioning into said holes (18) the channel (22) will be secured to said mounting plate (10);
    said channel (22) is "U" shaped having a generally flat bottom wall (26) and two parallel side walls (28, 30) extending from said bottom wall (26) in a first direction; and
    each of the ends of said walls (28, 30) have at least one of said mounting tabs (32) for entry into the holes (18) defined by said mounting plate (10).

2. The apparatus of claim 1 wherein said mirror opening (12) defined by said mounting plate (10) is rectangular in shape and said mirror (12) is rectangular in shape and larger than said mirror opening (12) defined by said mounting plate (10).

3. The apparatus of claim 2 wherein said resilient foam material (34) is a sheet of polyurethane.

4. The apparatus of claim 3 wherein said holes (18) defined by said mounting plate (10) are rectangularly shaped and said tabs (32) are rectangularly shaped to freely enter said holes (18) and said tabs (32) are constructed of a malleable material to allow deformation of the tabs (32) to secure said channel (22) to said mounting plate (10).

5. The apparatus of claim 4 wherein a first surface of said resilient foam material (34) is secured to said bottom wall (26) of said channel (22) by an adhesive and the nonreflective surface of said mirror (20) is secured to a second surface of said resilient foam material (34) by an adhesive.

* * * * *